G. J. BERNAU.
COOKING UTENSIL.
APPLICATION FILED NOV. 18, 1910.
987,691.
Patented Mar. 28, 1911.
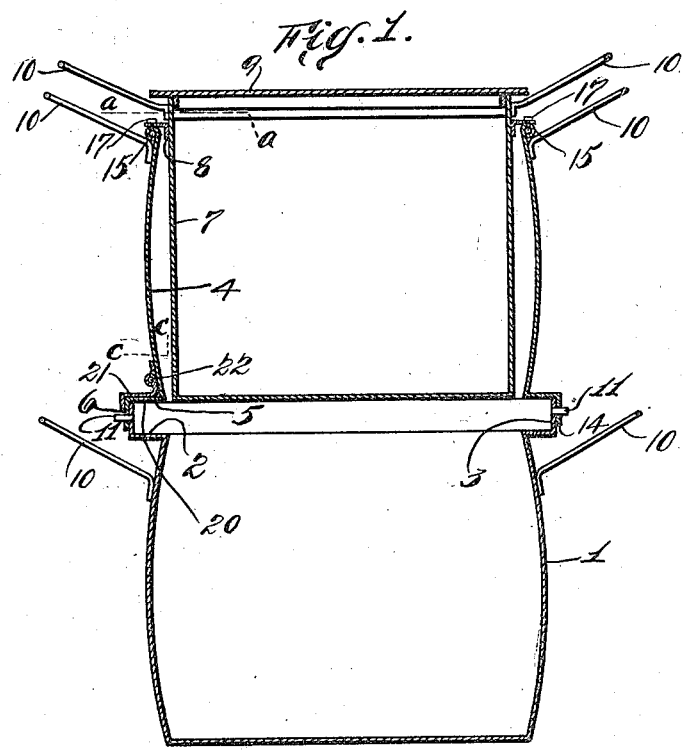
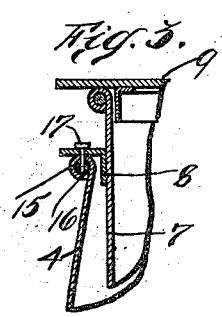
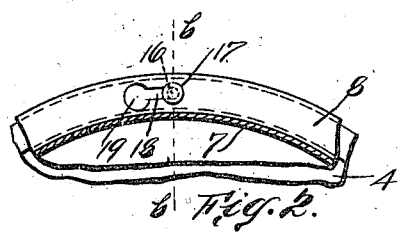
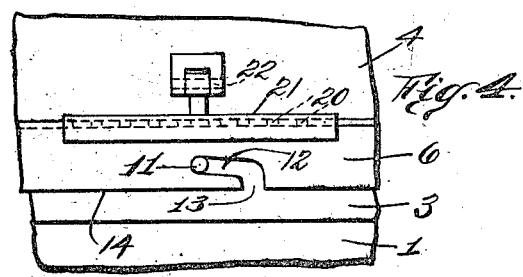
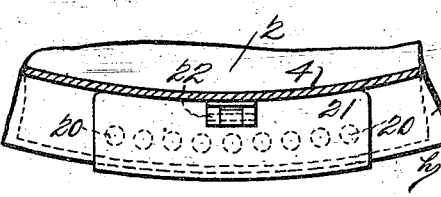
Witnesses:
Inventor:
Gottfried J. Bernau.
Attorney.

UNITED STATES PATENT OFFICE.

GOTTFRIED J. BERNAU, OF NEW YORK, N. Y.

COOKING UTENSIL.

987,691.

Specification of Letters Patent.

Patented Mar. 28, 1911.

Application filed November 18, 1910. Serial No. 592,965.

*To all whom it may concern:*

Be it known that I, GOTTFRIED J. BERNAU, a citizen of the United States of America, residing at the borough of Manhattan, city, county, and State of New York, have invented certain new and useful Improvements in Cooking Utensils, of which the following is a full, clear, and exact description.

This invention relates to an improvement in cooking utensils, the object being to provide a device wherein vegetables or other substances may be cooked and steamed simultaneously.

To carry out the above mentioned features, I provide a plurality of receptacles, one of said receptacles being adapted to contain substances to be cooked (boiled, for instance).

My invention also comprises a ring and an auxiliary pot or receptacle for steaming purposes, the said ring being adapted to support the said auxiliary pot.

I will now proceed to describe my invention in detail, the novel features of which I will point out in the claim, reference being had to the accompanying drawing, forming part hereof, wherein:

Figure 1 is a vertical central sectional view of my improved cooking utensil; Fig. 2 is an enlarged central sectional fragmentary detail plan view, the section being taken on a line *a—a* in Fig. 1; Fig. 3 is an enlarged vertical fragmentary sectional detail view, the section being taken on a line *b—b* in Fig. 2; Fig. 4 is an enlarged fragmentary side view, showing the means for locking the ring and main pot together; and Fig. 5 is a top plan sectional view thereof, the section being taken on a line *c—c* in Fig. 1.

Referring to the drawing, my invention consists of a main pot 1, provided at the top thereof with a flange 2, having an upstanding wall 3 thereupon, a ring 4 provided with an exterior annular flange 5 having a depending wall 6 thereupon, an auxiliary pot 7 provided with a flange 8, by which means the pot 7 is supported on the ring 4, and a cover 9, the said main pot 1, ring 4 and auxiliary pot 7 being provided with handles 10. The device, assembled as illustrated in Fig. 1, is adapted for simultaneous double usage, namely that of boiling and steaming, as articles may be placed in the main pot 1 and boiled, while articles within the auxiliary pot 7 may be steamed by the vapor arising from the liquid in the pot 1. If desirable the auxiliary pot 7 may be placed in the main pot 1, it being supported therein by the flange 8 resting upon the flange 2 of the pot 1. The main pot 1 may be used singly also. In this event the cover 9 will rest upon the flange 2 of the main pot 1.

In order to render my improved cooking utensil a firm structure, when assembled, I prefer to lock the members thereof together. To lock the ring 4 to the main pot, 1, I provide the upstanding wall 3 on the pot 1 with pins 11, which project outwardly, and the downwardly projecting wall 6, on the ring 4, with slots 12 (see Fig. 4, one only being shown), the said slots each having a mouth, or entrance thereto, 13. The slots 12 are angularly disposed relative to the bottom edge 14 of the wall 6. When the ring 4 is to be placed on the pot 1 the pins 11 and entrance 13 of each slot 12, will be caused to aline. The ring may now be lowered and turned. When turned, the ring 4 will be caused to lock with the pot 1, owing to the angular disposition of the slots 12, as the said ring will be forced downwardly when turned. The slot 12 on the opposite side of the wall 6, will be disposed oppositely to the one shown or rather will be in a reverse position. To lock the ring 4 and auxiliary pot 7 together, I provide the upper end 15 of the said ring (see Fig. 3) with pins 16 having heads 17, and the flange 8 on the pot 7, with slots 18 (one only being shown, see Fig. 2) which communicate with openings 19, the diameter of which is greater than that of the heads 17 of the pins 16. To place the pot 7 in the ring 4, the openings 19 and heads 17 of the pins 16 are caused to aline. The pot is then lowered and turned to the position shown in Fig. 2.

In order to permit of the straining off of the liquid in the main pot 1, without having to disconnect the members of the utensil, I provide the annular flange 5 of the ring 4 with openings 20 (see Figs. 1 and 5), having pivotally mounted or hinged adjacent thereto, as at 22, a cover 21. Under normal conditions the cover 21 will be down. Should, however, it become necessary to allow the vapor, generated in the pot 1, to escape, the said cover may be raised. To draw off the liquid in the pot 1, it is but necessary to raise the cover 1 and tip the utensil sufficiently to permit the liquid to escape through the openings 20.

Having now described my invention, what I claim and desire to secure by Letters Patent is:

A cooking utensil, consisting of a main pot having a flange at the upper end thereof, an upstanding wall carried by said flange, pins carried by said wall, a ring having an exterior annular flange at the lower end thereof, a depending wall carried by said flange provided with angularly disposed slots adapted to receive said pins, pins carried by said ring at the upper end thereof and provided with heads, an auxiliary pot carried by said ring, an annular flange carried by said auxiliary pot provided with slots adapted to receive the pins on said ring, the annular flange on the lower end of the said ring being also provided with openings, and a hinged cover carried by said ring adapted to close said openings, said cover being adapted for upward movement away from said openings.

Signed at New York city, N. Y., this 17" day of November, 1910.

GOTTFRIED J. BERNAU.

Witnesses:
DAVID HERSHFIELD,
ESTELLE O. HAMBURGER.